May 17, 1932.   C. W. SUMMERLOT   1,858,314
POWER UTILIZING APPLIANCE FOR MOTOR VEHICLES
Filed April 9, 1931    2 Sheets-Sheet 1

INVENTOR.
C. W. Summerlot
BY Marks & Clerk
ATTORNEYS.

May 17, 1932.  C. W. SUMMERLOT  1,858,314
POWER UTILIZING APPLIANCE FOR MOTOR VEHICLES
Filed April 9, 1931   2 Sheets-Sheet 2
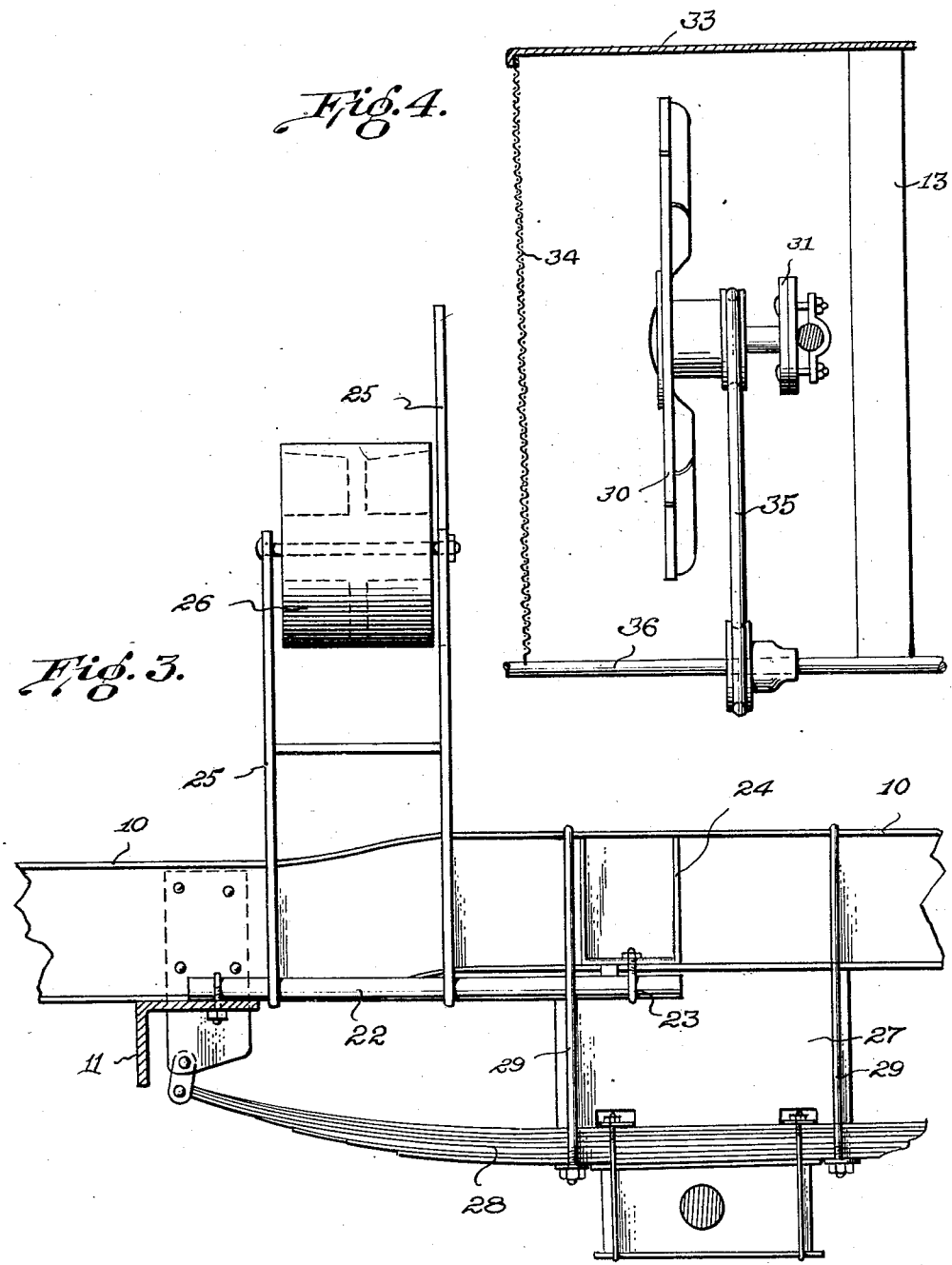
INVENTOR.
C. W. Summerlot
BY: *Marks & Clerk*
ATTORNEYS.

Patented May 17, 1932

1,858,314

UNITED STATES PATENT OFFICE

CYLDE W. SUMMERLOT, OF TERRE HAUTE, INDIANA

POWER UTILIZING APPLIANCE FOR MOTOR VEHICLES

Application filed April 9, 1931. Serial No. 528,937.

This invention relates to improvements in appliances for motor vehicles and more particularly to an arrangement for utilizing the power of the vehicle engine in the operation of machinery.

The invention has for its object to provide an appliance wherein the engine power may be taken directly from the drive shaft of the motor vehicle by means of a power transmitting belt and a drive pulley applied directly to the drive shaft.

A further object of the invention is the provision of means for disconnecting the drive shaft from the rear vehicle axle whereby during utilization of the engine power for purposes other than the propulsion of the vehicle the drive wheels of the rear vehicle axle remain motionless and the change-speed gear with which vehicles are ordinarily supplied may be utilized for varying the speed of the drive shaft.

A further object of the invention is to provide an idler pulley and mounting means therefor which cooperates with the drive belt during use of the power utilizing appliance.

A still further object of the invention is the provision of means for introducing an additional flow of air through the cooling radiator during the use of the appliance to avoid overheating of the vehicle engine.

In the accompanying drawings wherein an approved embodiment of the invention is illustrated:

Fig. 3 is an enlarged side elevation of one of the side members of the vehicle chassis, the view being taken from the inside and showing the details of the mounting for the idler pulley.

Fig. 4 is a detail section through the front portion of the vehicle chassis showing the arrangement for maintaining a circulation of cooling air through the radiator of the vehicle engine.

Figure 1:
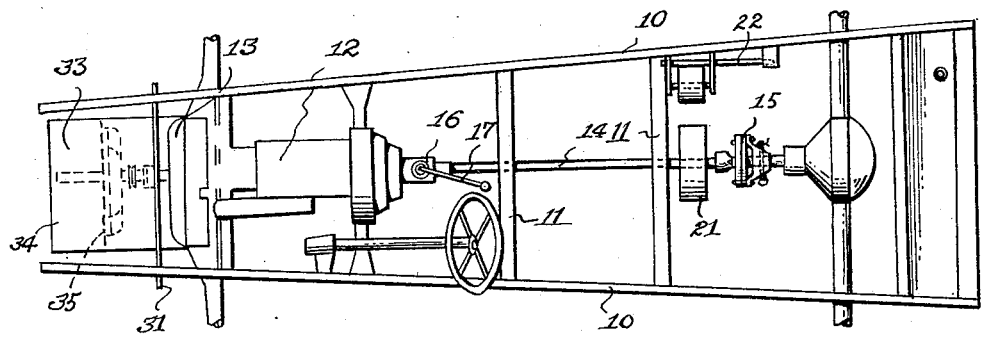
Fig. 1 is a plan view, partly broken away, of a vehicle chassis showing the invention applied to use.
Figure 2:
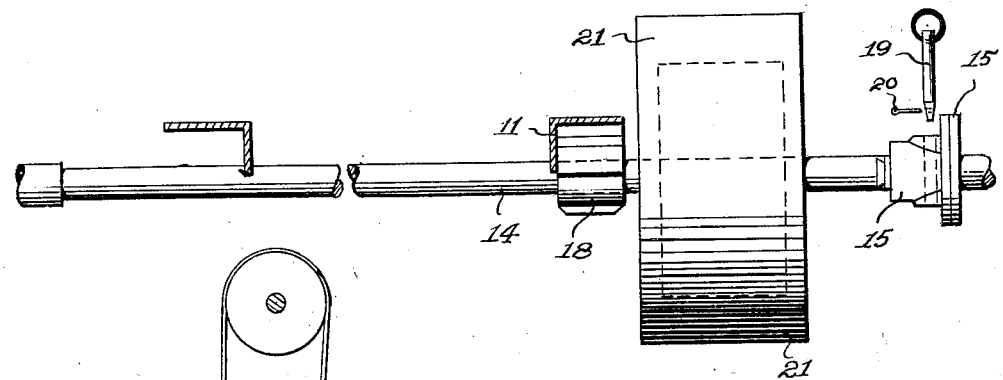
Fig. 2 is a fragmentary longitudinal section through two of the cross members of the chassis and showing a portion of the drive shaft, universal joint and drive pulley.
Figure 5:
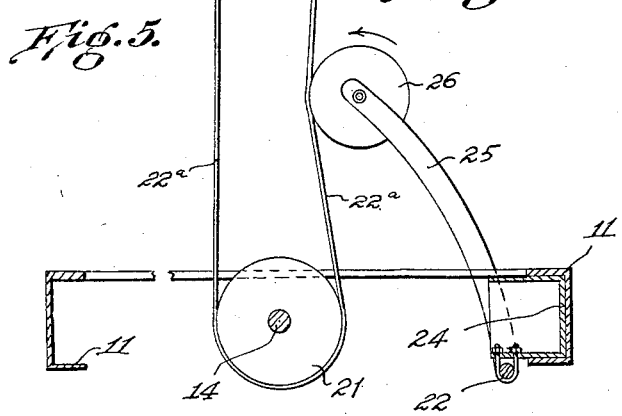
Fig. 5 is a transverse section through the vehicle chassis taken in the plane of the idler pulley.

Referring to the drawings in detail, 10 indicates the side members of the chassis of a conventional motor vehicle which are connected at points throughout their length by braces or cross members 11 certain of which constitute supports for the vehicle engine 12 equipped with the usual radiator 13 for cooling the liquid of the circulatory cooling system.

As usual, power is transmitted from the engine 12 to the drive axles of the vehicle by the drive shaft 14 which extends rearwardly from the engine 12 between the chassis members 10 and is connected with the differential gear by the universal joint 15 which latter is provided to accommodate the necessary movement of the rear axle housing with respect to the chassis. A change-speed gear 16 controlled as usual by a lever 17 is interposed between the drive shaft and the engine 12. The drive shaft 14 is journalled in bearings 18 provided on certain of the cross members 11.

According to the invention a form of universal joint 15 is provided in which that part which is coupled to the drive shaft 14 is connected therewith for the normal operation of the motor vehicle by a pin 19 which passes through the front part of the universal joint as well as through the drive shaft 14. The pin 19 is held in position against accidental displacement by a key 20, and upon removal of the pin 19 the drive shaft 14 may freely rotate within the universal joint without imparting rotary movement thereto.

At a point forwardly of the joint 15 a drive pulley 21 is rigidly fastened to the drive shaft 14 and is of such size as to be accommodated between the side members 10 and beneath the vehicle body. Power is transmitted from the drive pulley 21 to the desired point for utilization by means of a flexible belt 22a passing around the pulley 21. The machine (not shown) intended to utilize the power of the vehicle engine 12 may be arranged alongside of the vehicle and subsequent to the removal of the vehicle body it may be fastened directly upon the vehicle chassis. In the latter case the driven machine is supported and transported by the motor vehicle and may be thus moved from place to place under the power of the vehicle engine.

A supporting shaft 22 arranged parallel to the drive shaft 14 is arranged alongside of the drive pulley 21 and is secured at one end by a slip bolt 23 to one of the cross members 11 and at its opposite end by a similar bolt to a bracket arm 24 suitably secured in the channel of one of the side members 10. A frame 25 is pivotally and slidably mounted on the shaft 22 between the attaching bolts 23 and constitutes a support for an idler pulley 26 which, when the appliance is in use, rests against the belt 22a from the driving pulley 21 to the pulley of the machine to be driven.

In order to prevent excessive vibration of the rear part of the vehicle chassis during use of the power utilizing appliance, wooden bolsters 27 are interposed between the rear supporting springs 28 and the rear portions of the side members 10. The chassis 10 is thereafter drawn tightly against each bolster by U-bolts 29 which embrace the chassis members and the springs 28. In this manner the rear springs are prevented from vibrating incident to the transmission of power from the drive shaft 14 to the point of delivery of the power.

The appliance is exceedingly simple in construction and requires merely the removal of the pin 19 and the application of the power transmission belt 22a to the pulley 21. The wooden bolsters 27 are also inserted in position between the springs and chassis members and prevent undue vibratory movement. The change-speed gear 16 may be also utilized for varying the speed of the drive shaft 14 and the rate at which the driven machine is operated.

In order to avoid excessive heating of the engine 12 during utilization of its power for purposes other than driving the vehicle a supplementary blower fan 30 is rotatably mounted in brackets 31 suitably attached to the vehicle chassis and enclosed by a fan hood 33 likewise secured in position and arranged forwardly of the vehicle radiator 13. The hood 33 constitutes a guard to the open front end thereof and is preferably covered by a protecting cloth 34. The shaft of the fan 30 is connected by a belt 35 with an extension 36 applied to the front end of the engine crank shaft (not shown).

The bolsters 27 are preferably left in position permanently and in addition to preventing vibratory movement, they provide a substantial base and support for the machine being driven.

What I claim is:

1. In combination, a motor vehicle including a chassis and engine mounted therein, a rear axle, a drive shaft connecting the engine and rear axle, a universal joint interposed between the drive shaft and rear axle, said joint including a displaceable member adapted to disconnect the drive shaft from the rear axle, and a drive pulley carried by the drive shaft.

2. In combination, a motor vehicle including a chassis and engine mounted therein, a rear axle, a drive shaft connecting the engine and rear axle, a universal joint interposed between the drive shaft and rear axle, said joint including a displaceable member adapted to disconnect the drive shaft from the rear axle, a drive pulley carried by the drive shaft, and a change-speed gear interposed between the drive shaft and engine.

3. In combination, a motor vehicle including a chassis and engine mounted therein, a rear axle, a drive shaft connecting the engine and rear axle, a universal joint interposed between the drive shaft and rear axle, said joint including a displaceable member adapted to disconnect the drive shaft from the rear axle, and a drive pulley carried by the drive shaft, said displaceable member being constituted by a pin adapted for insertion through the universal joint and drive shaft for the normal operation of the motor vehicle and adapted, upon removal, to permit operation of the drive shaft from the engine independently of the rear axle.

4. In combination, a motor vehicle including a chassis and engine mounted therein, a rear axle, a drive shaft connecting the engine and rear axle, a universal joint interposed between the drive shaft and rear axle, said joint including a displaceable member adapted to disconnect the drive shaft from the rear axle, and a drive pulley carried by the drive shaft, said chassis including cross members, and bearings carried by certain of the cross members rotatably supporting the rear portion of the drive shaft in the vicinity of the drive pulley.

5. In combination, a motor vehicle including a chassis and engine mounted therein, a rear axle, a drive shaft connecting the engine and rear axle, a universal joint interposed between the drive shaft and rear axle, said joint including a displaceable member adapted to disconnect the drive shaft from the rear axle, a drive pulley carried by the drive shaft, and an idler pulley journalled on said chassis and arranged to engage a belt passing over the drive pulley.

6. In combination, a motor vehicle including a chassis and engine mounted therein, a rear axle, a drive shaft connecting the engine and rear axle, a universal joint interposed between the drive shaft and rear axle, said joint including a displaceable member adapted to disconnect the drive shaft from the rear axle, a drive pulley carried by the drive shaft, a shaft carried by the chassis, a frame slidably and pivotally mounted on said shaft, and an idler pulley mounted in said frame and adapted in one position of adjustment to engage a belt passing over the drive pulley.

In testimony whereof I affix my signature.

CLYDE W. SUMMERLOT.